(12) United States Patent
Ansari et al.

(10) Patent No.: US 12,147,288 B2
(45) Date of Patent: Nov. 19, 2024

(54) DISPLAY LINK POWER MANAGEMENT USING IN-BAND LOW-FREQUENCY PERIODIC SIGNALING

(71) Applicant: Intel Corporation, Santa Clara, CA (US)

(72) Inventors: Nausheen Ansari, Folsom, CA (US); Ziv Kabiry, Kfar-Saba (IL); Gal Yedidia, Bitzaron (IL)

(73) Assignee: Intel Corporation, Santa Clara, CA (US)

( * ) Notice: Subject to any disclaimer, the term of this patent is extended or adjusted under 35 U.S.C. 154(b) by 771 days.

(21) Appl. No.: 17/247,649

(22) Filed: Dec. 18, 2020

(65) Prior Publication Data
US 2021/0181832 A1 Jun. 17, 2021

(51) Int. Cl.
*G06F 1/3296* (2019.01)
*G06F 1/10* (2006.01)
*G06F 3/14* (2006.01)

(52) U.S. Cl.
CPC .............. *G06F 1/3296* (2013.01); *G06F 1/10* (2013.01); *G06F 3/14* (2013.01)

(58) Field of Classification Search
CPC ............. G06F 1/3296; G06F 1/10; G06F 3/14
See application file for complete search history.

(56) References Cited

U.S. PATENT DOCUMENTS

| | | | |
|---|---|---|---|
| 2010/0079444 A1 | 4/2010 | Kyriazis et al. | |
| 2010/0080218 A1 | 4/2010 | Kwa et al. | |
| 2011/0157198 A1 | 6/2011 | Vasquez et al. | |
| 2012/0079295 A1 | 3/2012 | Hayek et al. | |
| 2014/0173320 A1* | 6/2014 | Tripathi | G09G 5/12 713/375 |
| 2015/0113308 A1 | 4/2015 | Hayek et al. | |
| 2015/0261718 A1 | 9/2015 | Campbell et al. | |
| 2017/0344512 A1* | 11/2017 | Jen | G06F 13/385 |
| 2019/0042507 A1 | 2/2019 | Venkatesan et al. | |

OTHER PUBLICATIONS

EPO; Extended European Search Report issued in EP Patent Application No. 21198428.1, dated May 17, 2022; 20 pages.
EPO; Extended European Search Report issued in EP Patent Application No. 21197824.2, dated Mar. 11, 2022; 10 pages.
EPO; Partial European Search Report issued in EP Patent Application No. 21198428.1, dated Feb. 16, 2022; 21 pages.
U.S. Non-Final Office Action received in U.S. Appl. No. 17/127,417, dated Jun. 26, 2024, 15 pages.

* cited by examiner

*Primary Examiner* — Gary Collins
(74) *Attorney, Agent, or Firm* — Alliance IP, LLC

(57) ABSTRACT

In one embodiment, an apparatus includes a port comprising circuitry to couple the apparatus to one or more devices over a DisplayPort (DP)-based link and a processor to generate signals for communication over the DP-based link. The apparatus also includes memory with instructions to cause the processor to initiate a transition to a low power state in devices of the DP-based link by transmitting a sleep pattern signal over the DP-based link, and initiate a transition to an active power state in devices of the DP-based link by transmitting a wake pulse sequence and physical link establishment signal pattern over the DP-based link.

25 Claims, 11 Drawing Sheets

DISPLAY LINK POWER MANAGEMENT USING IN-BAND LOW-FREQUENCY PERIODIC SIGNALING

TECHNICAL FIELD

This disclosure relates in general to the field of computer systems and, more particularly, to power management for display links (e.g., DisplayPort-based links) using low-frequency periodic signaling (LFPS).

BACKGROUND

DisplayPort specifications currently do not have link power management mechanisms; however, embedded DisplayPort (eDP) specifications define a mechanism for Advanced Link Power Management (ALPM). The current eDP link management technique involves the use of wake signaling over a sideband AUX (auxiliary) interface. This technique may have one or more issues when applied to DisplayPort embodiments, however. For instance, it may require a tight coupling between the main link and the AUX interface that is unmanageable over the display topology (which may include a number of different devices, e.g., docks, branch devices, LTTPRs, etc.).

BRIEF DESCRIPTION OF THE DRAWINGS

Like reference numbers and designations in the various drawings indicate like elements.

DETAILED DESCRIPTION OF EXAMPLE EMBODIMENTS

In the following description, numerous specific details are set forth, such as examples of specific configurations, structures, architectural details, etc. in order to provide a thorough understanding of the present disclosure. It will be apparent, however, to one skilled in the art that these specific details need not be employed to practice embodiments of the present disclosure. In some instances, well known components or methods may be utilized, and such details haven't been described in detail in order to avoid unnecessarily obscuring embodiments of the present disclosure.

Figure 1:
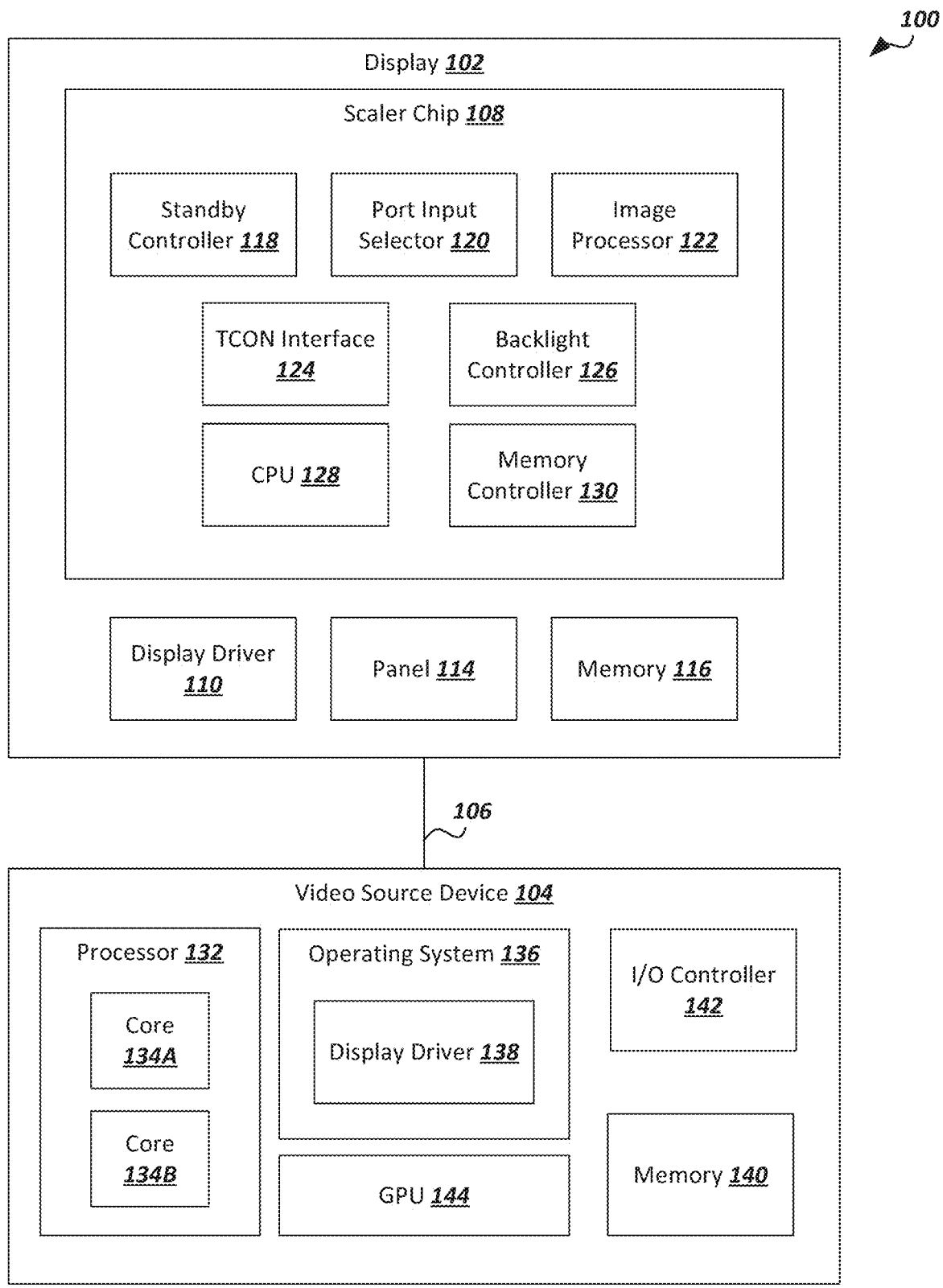
FIG. 1 illustrates a block diagram of an example computing system in accordance with certain embodiments.

FIG. 1 illustrates a block diagram of an example computing system 100 in accordance with certain embodiments. The example computing system 100 comprises a display 102 coupled to a video source device 104 (also referred to herein as a "display source" or "source") via a link 106. In the example shown, the display 102 is coupled to a video source device 104 to display a representation of a video signal received from the video source device 104. The display 102 comprises a scaler chip 108, a display driver 110, a panel 114, and a memory 116. Some embodiments may include a display with any suitable combination of components (including any of those shown or other components). Scaler chip 108 includes standby controller 118, port input selector 120, image processor 122, timing controller (TCON) interface 124, backlight controller 126, central processing unit (CPU) 128, and memory controller 130.

Standby controller 118 is operable to manage operations associated with entry into standby and exit from standby for the display 102. For example, the standby controller 118 may coordinate a context save and restore procedure, or the entry into and exit from standby for the display 102. In various embodiments, standby controller 118 may coordinate with other components of display 102. In some embodiments, all or a portion of standby controller 118 may be integrated within another component of the scaler chip 108, such as the port input selector 120 or CPU 128; or other component of the display 102. Thus, in some embodiments the standby controller 118 may be a distinct logic component or may include a collection of logic from various components of the scaler chip 108 (or other components of the display 102).

Port input selector 120 is operable to select a port from among a plurality of ports of the display 102 and to pass a video signal received through the port to a processing pipeline of the display 102. The port input selector 120 may include a port interface that comprises or is coupled to a plurality of ports of the display. The display 102 may include any number of ports of any type. For example, display 102 may include a DisplayPort™ port, a High-Definition Multimedia Interface (HDMI™) port, a Universal Serial Bus (USB) port, a Digital Visual Interface (DVI) port, a Video Graphics Array (VGA) port, or other suitable port. Display 102 may include any suitable combination of ports, including multiple ports of the same type or multiple ports of different types. The port input selector 120 may include selection logic coupled to the port interface to select a particular port and to pass the signal received through the particular port on to additional logic (e.g., the standby controller 118, the image processor 122, etc.). In some embodiments, the port input selector 120 may also include conversion logic to receive a signal from any of the ports of the display 102 and convert the signal to a common format (e.g., a digital pixel format) for further processing.

Image processor 122 may receive a video signal from the port input selector 120 and perform further processing on the video signal. In some embodiments, the image processor 122 may execute one or more algorithms to improve the image quality of the video signal. For example, image processor 122 may perform resolution upscaling, contrast adjustment, color adjustment, or other suitable image processing. In some embodiments, image processor 122 may superimpose one or more images (e.g., a user menu of the display 102) on the video signal.

TCON interface 124 may receive a processed signal from image processor 122 and convert the signal to a format (e.g., a serial high speed interface format such as Embedded DisplayPort™ (eDP) or V-by-One®) compatible with a TCON of the display driver 110.

Backlight controller 126 may include a backlight driver and may generate signals that may be used by the backlight driver to produce current to light up the panel 114.

CPU 128 may provide various functions of the display 102. For example, the CPU 128 may manage the on-screen display and user configuration adjustments of the display 102. The CPU 128 may communicate with other components of the display 102 (e.g., to bring up a menu or change the brightness of the display in response to a user selection).

Memory controller 130 may control the transfer of data between one or more components of the scaler chip 108 and the memory 116. Memory 116 may include any suitable volatile or non-volatile memory to support the operations of the display 102. For example, the memory 116 may be used to store instructions executed by the components (e.g., CPU 128, standby controller 118, image processor 122, or other component), frame data (e.g., values of pixels), on-screen display data, or other suitable data. In some embodiments, memory 116 may comprise multiple different memory modules (e.g., each of which may be dedicated to particular types of data) located on any one or more components of the display 102. For example, in various embodiments, the scaler chip 108 may include one or more memory modules to support the operation of the scaler chip 108.

Display driver 110 may comprise circuitry to receive a video signal and to drive electrical signals to the display elements of the panel 114 to cause the panel 114 to display the video. In a particular embodiment, display driver may comprise a TCON. In a particular embodiment, display driver 110 comprises one or more row and column drivers to drive the display elements. The display driver 110 may include one or more digital to analog converters (DACs) to produce the appropriate currents to drive the display elements.

In various embodiments, panel 114 may generate light or allow for the transmission of light in a plurality of pixels. Panel 114 may comprise a display substrate on which a plurality of pixels are located. The pixels define a display area within which a video signal comprising still images, videos, or other content defined by a video signal can be displayed. Panel 114 may utilize any suitable display technology, such as, e.g., a thin-film-transistor liquid crystal display (TFT LCD), micro-light emitting diode (micro-LED), organic LED (OLED), quantum dot LED (QLED), or other suitable display technology.

The components of the display 102 may be arranged in any suitable manner. In one embodiment, a first printed circuit board may comprise the scaler chip 108 and a second printed circuit board may comprise the display driver 110 (in some embodiments a separate printed circuit board may house the TCON). In some embodiments, memory 116 or a portion thereof may be included on the first printed circuit board (or integrated on the scaler chip 108).

Video source device 104 may be any suitable computing device to communicate a video signal to the display 102. For example, video source device 104 may be a desktop computing system, a laptop computing system, a server computing system, a storage system, a handheld device, a tablet, or other suitable computing device.

In the embodiment depicted, video source device 104 comprises processor 132, operating system 136 (which may be executed by processor 132), memory 140, I/O controller 142, and graphics processing unit (GPU) 144. Processor 132 is depicted as including two processing cores 134A and 134B, though the processor 132 may include any suitable number of cores.

The operating system 136 may execute a display driver 138 that controls the connection from the video source device 104 over the link 106 to the display 102 and the communication of the video signal (and supporting communications) over the connection.

The GPU 144 may generate the video signal that is communicated to the display 102. In the embodiment depicted, the GPU 144 is a discrete component, though in other embodiments, the GPU 144 may be integrated with processor 132.

Memory 140 may include any suitable volatile or non-volatile memory to support the operations of the display 102. The memory 140 may be used to store instructions executed by the components (e.g., processor 132 or GPU 144), or other suitable data. In some embodiments, memory 140 may comprise multiple different memory modules (e.g., each of which may be dedicated to particular types of data) located on any one or more components of the display video source device 104. In some embodiments, memory 140 may comprise a system memory.

Link 106 may comprise any suitable transmission medium operable to communicate analog or digital data between the display 102 and the video source device 104. In some embodiments, link 106 may comprise a cable with a connector on each end. For example, link 106 may comprise a DisplayPort™ cable, an HDMI™ cable, a USB cable, a DVI cable, a VGA cable, or other suitable cable. In some embodiments, the link 106 may be an internal connection between the video source device 104 and the display 102 (e.g., for notebook computers or other computer systems with connected or embedded displays).

In some embodiments, the link 106 may implement a specification-based protocol, such as a DisplayPort or Embedded DisplayPort (eDP) protocol. Current eDP specifications define a mechanism for Advanced Link Power Management (ALPM), while current DisplayPort specifications do not have link power management mechanisms. The current eDP link management technique involves the use of wake signaling over a sideband AUX (auxiliary) interface. This technique may have one or more issues, however, when applied to DisplayPort topologies. For instance, it may require a tight coupling between the main link and the AUX interface that is unmanageable over the display topology (which may include a number of different devices, e.g., docks, branch devices, LTTPRs (Link-Training Tunable PHY Repeaters), etc.). There is no current solution in DisplayPort specifications for link state power management over the display topology—i.e., once the display is on, the link must stay up and in an active state.

Embodiments of the present disclosure may provide a unified link-based mechanism for entry and exit from power managed link states in both DP and eDP topologies. In certain instances, embodiments of the present disclosure may be comparable in power to the current eDP mechanism, but may be able to be deployed for both eDP and DP topologies. In particular embodiments, for instance, a Low Frequency Periodic Signaling (LFPS) may be utilized over a main link. The LFPS does not require a handshake over the AUX interface and can therefore be applied to a DisplayPort topology. In addition, it provides a low latency and low power mechanism that can be used for eDP as well, allowing for a unified approach for link state power management for both eDP and DP topologies.

Figure 2:
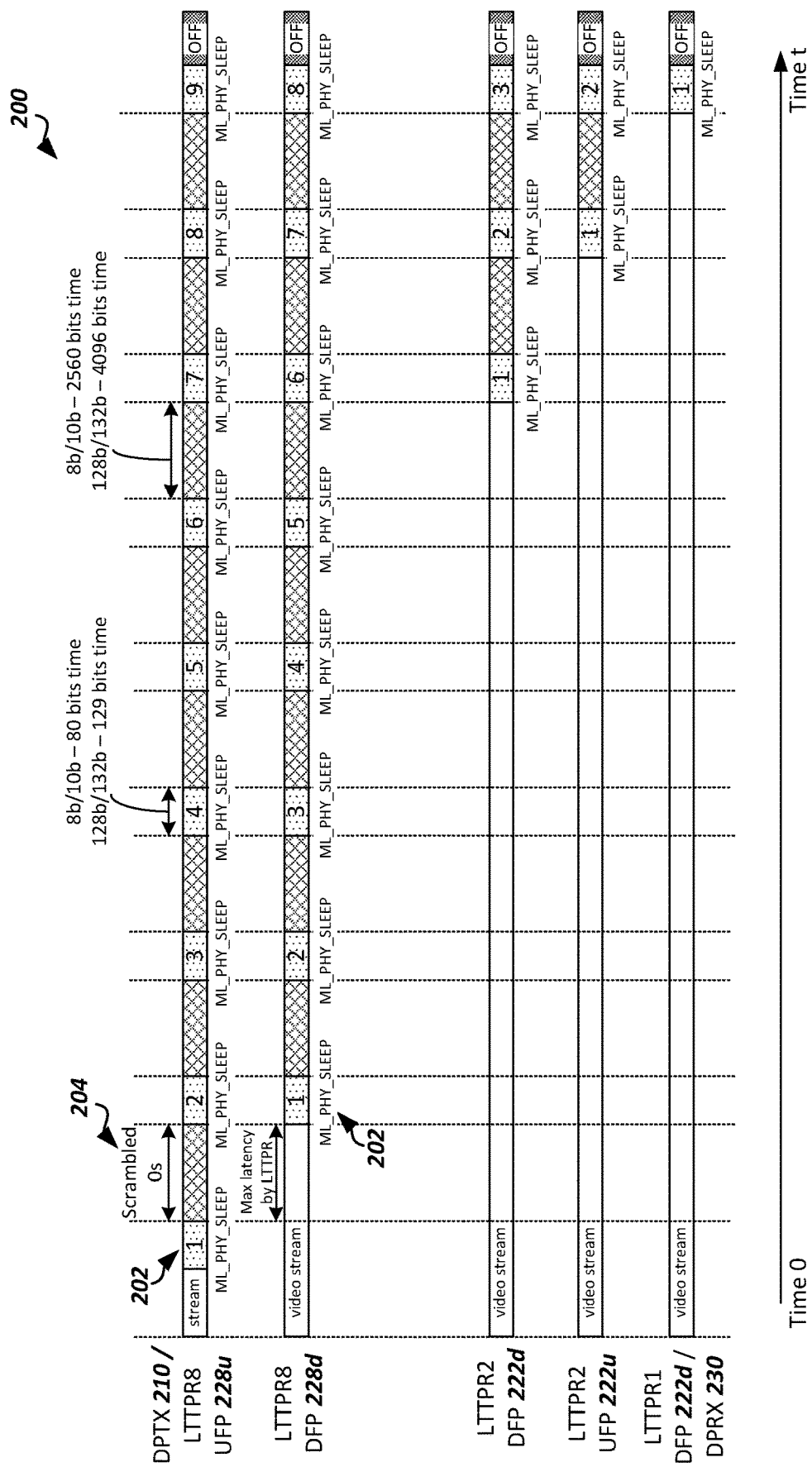
FIG. 2 illustrates an example sleep signaling sequence in a DisplayPort-based topology in accordance with certain embodiments.

FIG. 2 illustrates an example sleep signaling sequence 200 in a DisplayPort-based topology in accordance with certain embodiments. In particular, the examples show a sleep signal pattern 202 that is transmitted from a DisplayPort-compatible or eDP-compatible transmitter (DPTX) 210 (e.g., video source device 104 of FIG. 1) to a DisplayPort-compatible or eDP-compatible receiver (DPRX) 230 (e.g., display 102 of FIG. 1) via a number of intermediate LTTPRs 221-228. As per certain DisplayPort specifications (e.g., DP v2.0), a source device (e.g., source device 104 of FIG. 1) may be required in certain instances to indicate to a sink device (e.g., display 102 of FIG. 1) through an AUX-based DPCD (DisplayPort Configuration Data) register write operation indicating that it is turning off the main link. This can add hundreds of micro-seconds of latency, which makes this scheme unusable for quick turnoff/on between active frames. However, in embodiments of the present disclosure, source device may transmit a specific pattern or packet (e.g., as described below) on the main link that indicates the main link is transitioning to a lower power state. The source, intermediate branch/retimer (e.g., LTTPR), and sink devices may accordingly transition into low power states locally after the indication is received.

As shown in FIG. 2, each device in the topology may decode the advanced link power management pattern/code sequence (e.g., pattern 202, which may be a ML_PHY_SLEEP as described below), or packet and react accordingly. As there are multiple devices in the example display topology shown in FIG. 2, the DPTX 210 and LTTPRs (222-228) may continue to transmit the link power management patterns on the main link as shown until all the devices in the topology have decoded the pattern and taken appropriate action.

For instance, the DPTX 210 may transmit a ML_PHY_SLEEP/_STANDBY pattern (e.g., as described below) a number of times equal to the number of devices on the link other than the source device (e.g., number of intermediate devices+display), which may be equal to one more than the number of LTTPRs in the topology (TOTAL_LTTPR_CNT+1). In the example shown, that means the DPTX 210 transmits the pattern 9 times. The DPTX may transmit each sleep pattern in 80 bits for 8b/10b encoding or 129 bits for 128b/132b encoding, and may transmit a minimum of 2560 bits (for 8b/10b) or 4096 bits (for 128b/132b) of scrambled zeroes 204 between the patterns 202 as shown in FIG. 2, after which it may provide an output at the common mode voltage (indicated by OFF in FIG. 2). The DPRX 230, after receiving a ML_PHY_SLEEP/STANDBY pattern 202 may turn off its high-speed receiving circuit until it senses an Low Frequency Periodic Signaling (LFPS) wake signal as described below. Intermediate LTTPRs may count the number of ML_PHY_SLEEP/_STANDBY patterns it receives/detects on its UFP, and once the number of patterns detected becomes equal to its LTTPR_CNT+1, it may provide an output at the common mode voltage on its DFP TX_PHY. For example, LTTPR8 228 in FIG. 2 (LTTPR_CNT=8) may provide the common mode voltage after detecting 9 ML_PHY_SLEEP/STANDBY patterns on the UFP 228u. The maximum latency on the ML_PHY_SLEEP transmission through the LTTPR may be no more than 2560 bits (for 8b/10b) or 4096 bits (for 128b/132b) bit-time.

In certain instances, the pattern used for reduced bit rate (RBR) and high bit rate (HBR) frequencies could be the same patterns used in the eDP standard for link management, as shown in Table 1 below. In the case of ANSI8b10b encoding, the transmitter may maintain disparity across the sequence.

TABLE 1

Link Management signaling scheme for ANSI8b10b encoding

| Coding | PHY Layer Power-Down Signal | Advanced Link Power Management Code Sequence |
|---|---|---|
| 8b_10b | ML_PHY_SLEEP | K28.5, K27.7, K28.5, K27.7, K28.5, K28.5, K28.5, K28.5 |
|  | ML_PHY_STANDBY | K28.5, K27.7, K28.5, K27.7, K27.7, K27.7, K27.7, K27.7 |

An example of an advanced main link power management packet for UHBR* frequencies with 128b_132b encoding are shown in Table 2 below. The 1-bit CDI may be set to 1 and XORing 12 of the 1-bit CDIs with 333h for DC balancing may continue as in normal operation. The sequence shown in Table 2 is without pre-coding—during transmission pre-coding would be applied to the sequence, hence DC balancing may be maintained. The pattern may be transmitted starting at any 129-bit Word boundary.

TABLE 2

Link Management signaling scheme for 128_132b encoding

| Coding | PHY Layer Power-Down Signal | Advanced Link Power Management Packet |
|---|---|---|
| 128b_132b | ML_PHY_SLEEP | CDI + 89898989, 89898989, 89898989, 89898989 |
|  | ML_PHY_STANDBY | CDI + 89555555, 89555555, 89555555, 89555555 |

Figure 3:
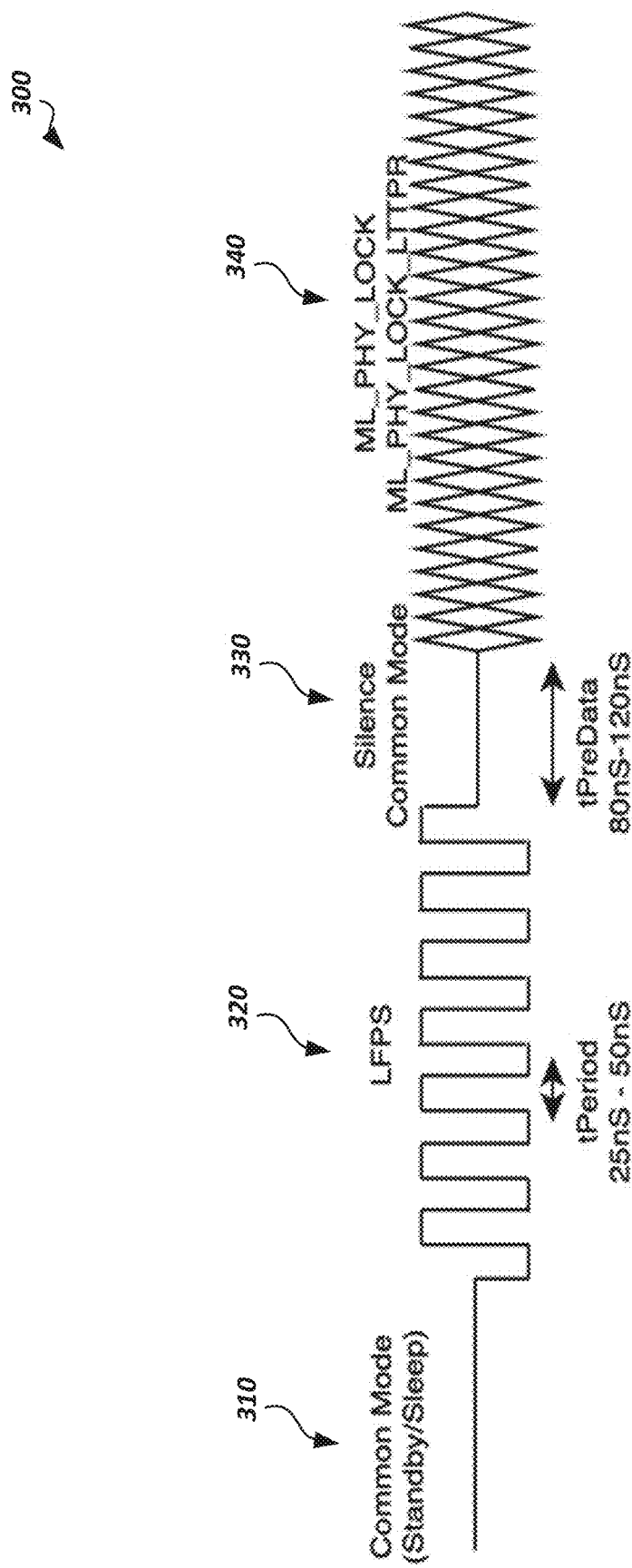
FIG. 3 illustrates an example Low Frequency Periodic Signaling (LFPS)-based sequence in accordance with certain embodiments.

FIG. 3 illustrates an example Low Frequency Periodic Signaling (LFPS)-based sequence 300 in accordance with certain embodiments. The example LFPS sequence 300 may be transmitted by a display source (e.g., video source device 104 of FIG. 1) over a link (e.g., link 106) to a display (e.g., display 102 of FIG. 1) to wake the display from a sleep or standby state. In certain embodiments, the LFPS sequence 300 may be implemented in a DisplayPort or Embedded DisplayPort (eDP)-based topology.

In certain embodiments, two low-power link states may be defined, e.g., a "ML_PHY_SLEEP" sleep state and "ML_PHY_StandBy" standby state. These link states may address a wake scenario for Decision Feedback (DFE) refresh at HBR3 (High Bit Rate 3) and UHBR (Ultra High Bit Rate). In some instances, the standby state may be implemented, e.g., when the main link off time is below 40 uSec, and the sleep state may be implemented when the main link off time is 40 uSec and above. Aspects of the example LFPS sequence 300 or another type of LFPS signal may be sent over the main link to exit from either of these power management link states.

The example LFPS sequence 300 includes segments 310, 320, 330, 340. The segment 310 indicates a common mode, e.g., the standby or sleep mode as described above. The segment 320 includes a set of low-frequency pulses that are used to indicate a transition out of the sleep or standby state. In certain embodiments, the segment 320 includes at least 7 fixed length pulses with a pulse length (tPeriod) between 25 ns-50 ns, amounting to a total segment time between 175 ns-400 ns. The segment 330 is a silent period in which no signals are transmitted. In certain embodiments, the period of silence may be defined as the lanes in Common Mode, and the silence period may be between 80 nS-120 nS before a signal is transmitted in the segment 340. The signal transmitted in the segment 340 may be a PHY link (physical link) establishment signal. For instance, in the example shown, the segment 340 includes a ML_PHY_LOCK or ML_PHY_LOCK_LTTPR pattern transmission. The ML_PHY_LOCK/ML_PHY_LOCK_LTTPR pattern transmission may be used for calibration, equalization, and/or activation by a display or LTTPR in certain instances.

In certain embodiments that implement reduced bit rate (RBR) or ultra high bit rate (UHBR) frequencies that use ANSI8b10b coding, the ML_PHY_LOCK pattern may include TPS4 (CP2520 Pattern 3)–K28.0–, K28.5–, K28.5+, K28.0–, 248 00 hs, and the ML_PHY_LOCK_LTTPR may include the CP2520 Pattern 1 with count indication of 248: –K28.0–, K28.1+, K28.1+, K28.0–248 00 hs. In certain embodiments that implement UHBR* frequencies that use 128b/132b encoding, the ML_PHY_LOCK pattern is the same as 128b/132b_tps2 with one change where the LT_SCRAMBLER_RESET PHY sync replaces replaced every 4th PHY_SYNC_ONLY PHY sync symbol, as opposed to every 16th on the 128b/132b_tps2. This pattern may reduce wake latency in certain instances. The ML_PHY_LOCK_LTTPR pattern for 128b/132b_tps2_wake_LTTPR may be the same as the 128b/132b_tps2_wake pattern but with new coding for PHY_SYN_ONLY symbol 3355AA55h, replacing 333C3C3Ch.

In some embodiments, devices in the topology may repeat the transmission of the LFPS downstream to other devices of the topology after detecting the pulse sequence of segment 320. For example, an upward facing port (UFP) in a branch device (e.g., LTTPR_UFP) may transmit or repeat the LFPS to the next downstream device once a threshold number of pulses (e.g., 3) are detected. Table 3 below indicates example LFPS Parameters that may be implemented. In some eDP topology embodiments, the LPFS may use lower clock frequencies (e.g., 1 MHz) to reduce power with increased latency.

TABLE 3

| LFPS Parameters | | | | |
| --- | --- | --- | --- | --- |
| Symbol | Description | Min | Max | Units |
| tPeriod | Period of LFPS cycle (clock pattern) - enables clock frequences between 20-40 MHz | 25 | 50 | ns |
| LFPS Period | Duration for LFPS Sequence 7-10 pulses of tLFPS_Cycle | 175 | 400 | ns |
| tSilence | Period of time for which slience shall be set after the LFPS sequence | 80 | 120 | ns |
| V_CM_AC_LFPS | Common mode noise | — | 100 | mV pk-pk |
| V_TX_DIFF_PP_LFPS | LFPS peak-to-peak differential amplitude | 800 | 1200 | mV pk-pk |
| V_LFPS_RX_DETECT_TH | LFPS RX detect threshold -- Signal shall be rejected below minimum level and shall be accepted above maximum level | 100 | 300 | mV pk-pk |

TABLE 3-continued

| LFPS Parameters | | | | |
| --- | --- | --- | --- | --- |
| Symbol | Description | Min | Max | Units |
| tRiseFall | Rise/Fall time of LFPS signal, measured from 20% to 80% of the signal dynamic | — | 4 | ns |
| LFPS_DUTY_CYCLE | Duty cycle of the LFPS signal - applies for all LFPS cycles | 45 | 55 | % |

Figure 4:
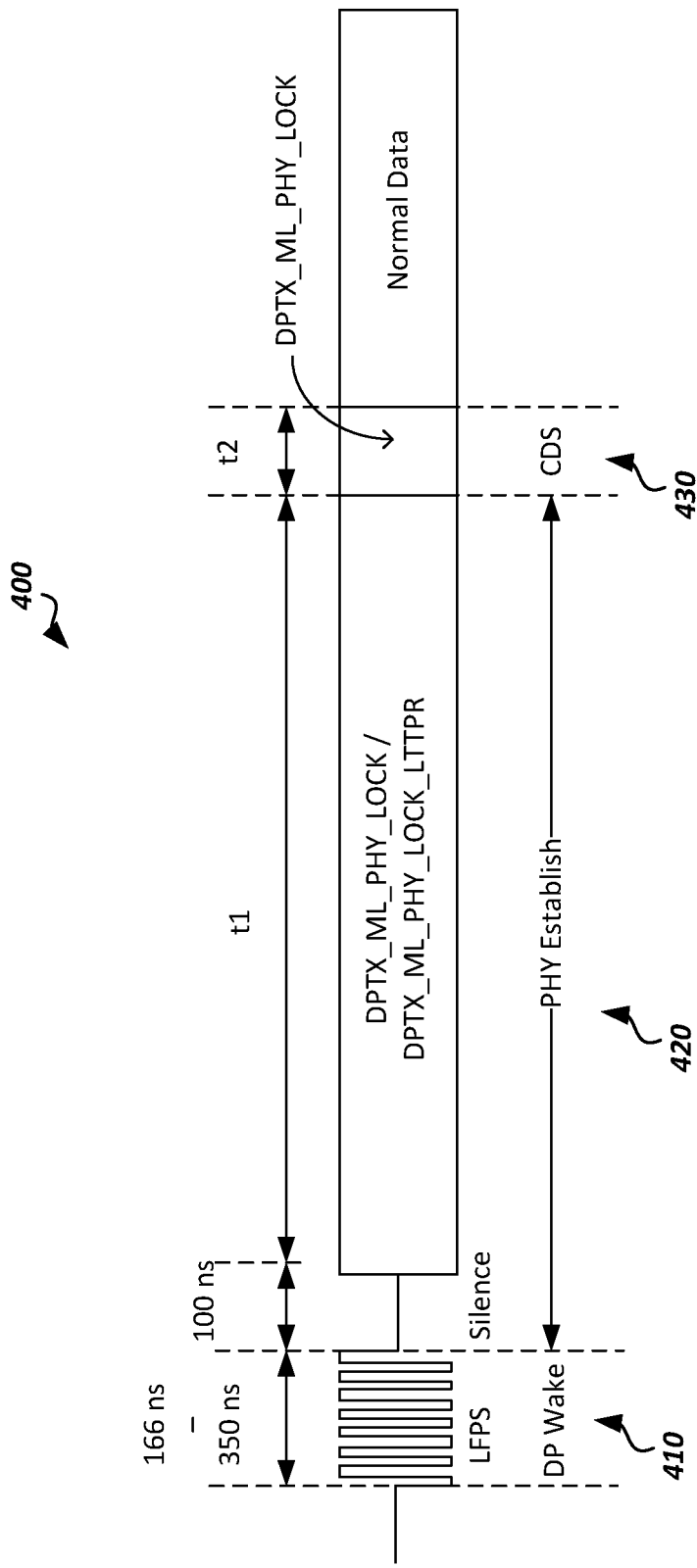
FIG. 4 illustrates an example LFPS-based wake sequence in accordance with certain embodiments.

FIG. 4 illustrates an example LFPS-based wake sequence 400 in accordance with certain embodiments. The example wake sequence 400 may be transmitted by a display source (e.g., video source device 104 of FIG. 1) over a link (e.g., link 106) to a display (e.g., display 102 of FIG. 1) to wake the display from a sleep or standby state. In certain embodiments, the wake sequence 400 may be implemented in a DisplayPort or Embedded DisplayPort (eDP)-based topology. In the example shown, the wake sequence 400 includes three segments 410, 420, 430, followed by a transmission of data on the link.

The first segment 410 includes a pulse sequence similar to segment 320 of FIG. 3. In the example shown, the pulse sequence of segment 320 includes seven pulses in a period of 166 ns-350 ns. However, any suitable number of pulses and timing may be implemented in other embodiments. In certain embodiments, the pulse sequence may be repeated sequentially over each hop of a topology starting at the display source and ending with the last hop terminating in the display. In certain embodiments, the sequential wake sequence may takes about 175-350 usec period per hop.

The second segment 420 includes a physical link (PHY) establishment signaling sequence, which may include link training information for the devices of the link between the display source and display. In the example shown, the second segment 420 begins with a period of silence (e.g., 80-120 ns) followed by a ML_PHY_LOCK/ML_PHY_LOCK_LTTPR sequence for a period t1 (e.g., 25 uSec for exit from Standby and 50 uSec for exit from sleep to enable DFE calibration). The silence period and period t1 may be of any suitable length of time, e.g., as shown below in Table 2. In certain instances, the display source (or LTTPR UFP) may have completed CDR_DONE and EQ adjustment based on the pattern (ML_LOCK_PHY for the UFP of the most upstream LTTPR and for ML_LOCK_PHY_LTTPR for the rest of the UFP's) by the end of the PHY Establishment period t1. In certain embodiments, the PHY establishment sequence may be repeated sequentially on all the hops of the topology to reduce latency. For example, each LTTPR in the topology may transmit a locally generated ML_PHY_LOCK_LTTPR pattern on its downward facing port (DFP).

The third segment 430 includes a sequential clock and data switch (CDS) sequence, which may be used to establish a clock signal (e.g., from the GPU) in the topology and may be when the symbol and lane alignment occur. The CDS period t2 may be link-rate dependent, in certain instances. Aspects of the CDS sequence are described further below.

These three phases may initiate completion of the exit from the low power states in the link devices to an active power state, and thereafter normal data transmission (video stream) may begin as shown.

Table 4 below indicates example wake sequence latencies for DisplayPort UHBR10 implementations.

TABLE 4

Example Wake Sequence latencies for UHBR10

| Time name | Max | Total Wake Standby | Total Wake Sleep |
|---|---|---|---|
| LFPS | 350 ns | 350 ns | 350 ns |
| Silence | 120 ns | 470 ns | 470 ns |
| t1 Standby | 25 uSec | 25.47 uSec | N/A |
| t1 Sleep | 50 uSec | N/A | 50.47 uSec |
| t2 | 11.7 uSec | 37.17 uSec | 62.17 uSec |

Figure 5A:
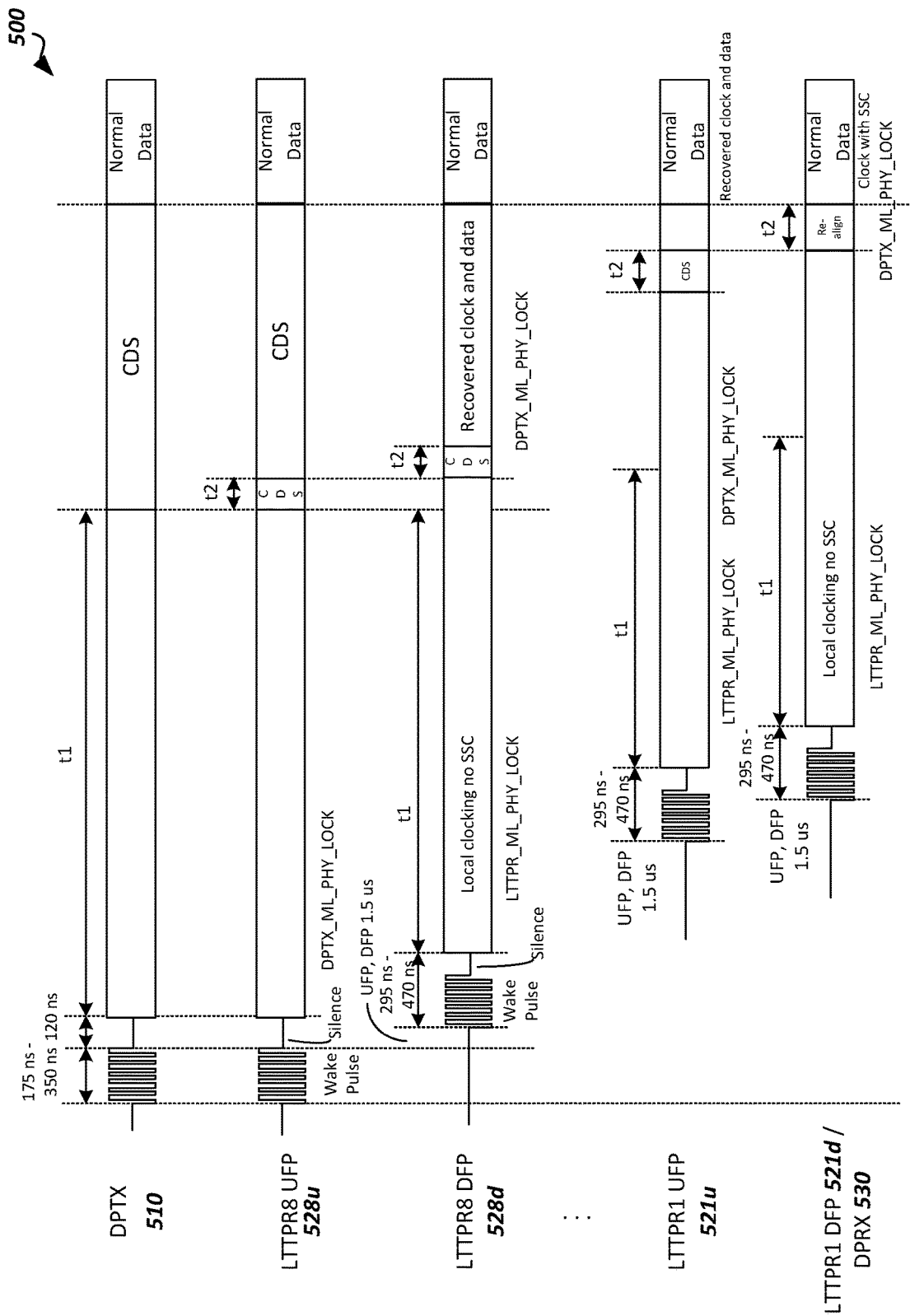
FIGS. 5A-5B illustrate an example LFPS-based wake sequence in a DisplayPort-based topology in accordance with certain embodiments.
Figure 5B:
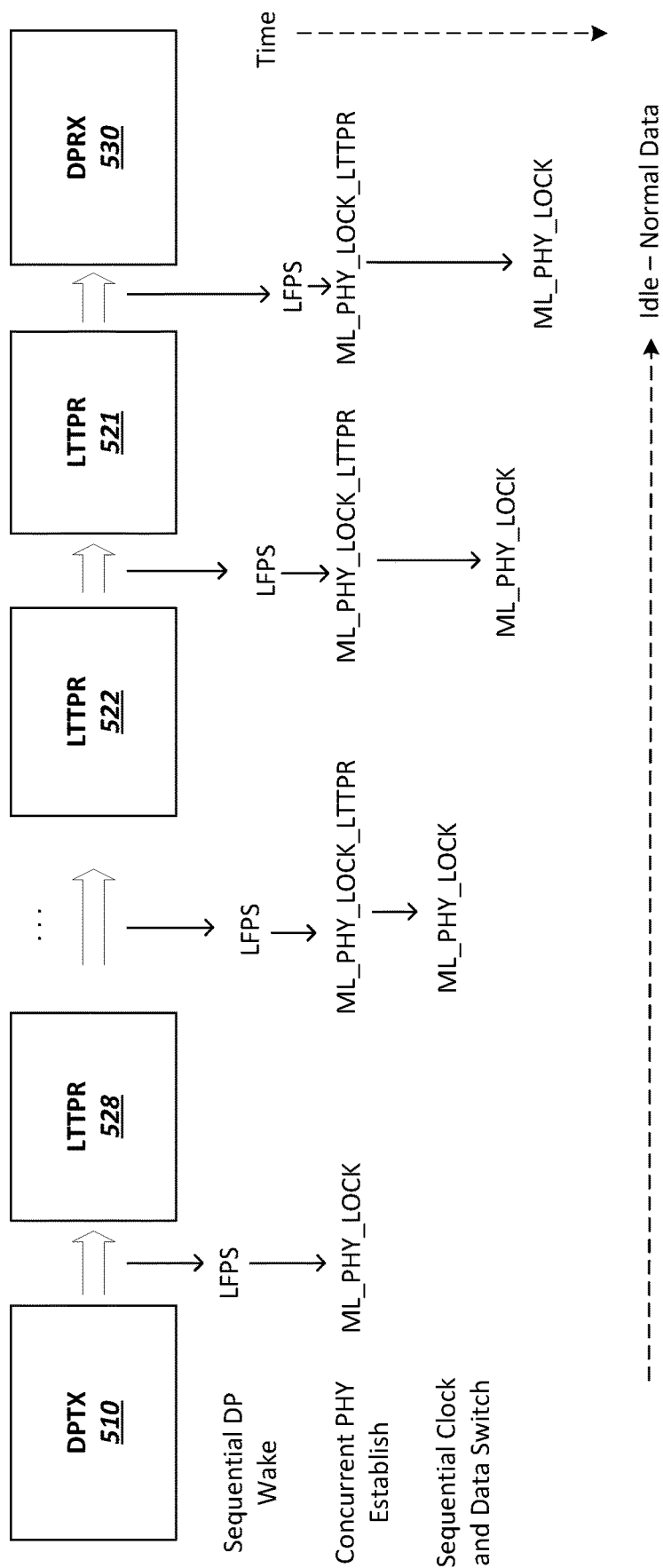

FIGS. 5A-5B illustrate an example LFPS-based wake sequence 500 in a DisplayPort-based topology in accordance with certain embodiments. In particular, the examples show an LFPS-based wake sequence that is transmitted from a DisplayPort-compatible or eDP-compatible transmitter (DPTX) 510 (e.g., video source device 104 of FIG. 1) to a DisplayPort-compatible or eDP-compatible receiver (DPRX) 530 (e.g., display 102 of FIG. 1) via a number of intermediate LTTPRs 521-528, which repeat aspects of the LFPS-based sequence as shown. The LTTPRs may be implemented at various points in the link between the DPTX and DPRX (e.g., link 106 of FIG. 1), such as, for example, in a dock, USB hub, or other intermediate device between the DPTX and DPRX. The same or similar LFPS-based sequence shown in FIG. 5A may be implemented in other topologies as well.

In the example shown in FIG. 5A, the DPTX initiates a wake pulse sequence similar to the sequences of segment 310 of FIG. 3 and segment 220 of FIG. 2, which is transmitted to/received by the UFP of LTTPR8 428u. The wake pulse sequence is followed by a period of silence, a PHY establishment sequence, and a CDS sequence as described above. The LTTPR8 transmits the wake pulse sequence downstream in the topology via the DFP 428d (after a small 1.5 us delay). This process is repeated downstream through the other LTTPRs as shown in FIGS. 5A-5B (FIG. 5B illustrates another view of how each of the signals of the LFPS-based wake sequence are transmitted downstream over time).

In some embodiments, an LTTPR may switch from the ML_PHY_LOCK_LTTPR pattern to the ML_PHY_LOCK pattern when it completes the concurrent PHY establishment, with the most upstream LTTPR first and the most downstream LTTPR last. The LTTPR may lock to the incoming clock signal from the GPU during the CDS sequence. Prior to entering the CDS sequence, the PHY EQ may be stable and the symbol boundary/inter-lane may be aligned with incoming ML_PHY_LOCK or ML_PHY_LOCK_LTTPR signals.

In some embodiments, the CDS sequence may include the follow operations. First, a LTTPR_UFP may detect the pattern change from the ML_PHY_LOCK_LTTPR to ML_PHY_LOCK pattern, and a loss of lanes/symbol alignment may result due to the clock switch. After three consecutive Training Pattern Sequence (TPS) cycles of the ML_PHY_LOCK pattern, the LTTPR_UFP may realign to the incoming ML_PHY_LOCK. The TPS patterns may be predetermined patterns transmitted on the main link during a link training process. After verifying at least four consecutive TPS cycles, the LTTPR may switch the reference clock of the DFP serial bit clock generation from a local clock to the recovered clock of the UFP, which may take about ~0.3 uSec in some instances. Thereafter, the LTTPR may switch the DFP transmission pattern from the locally-generated ML_PHY_LOCK_LTTPR to the incoming ML_PHY_LOCK, which may require at least two consecutive TPS cycles of ML_PHY_LOCK before switching to Normal Data in some instances. The total time required may be around 9 TPS cycles+0.3 uSec, in certain instances. The CDS sequence may end with a scramble reset as first symbol for 8b/10b SST or MST and POST_LT_SCRAMBLE_RESET for 128b/132b.

Figure 6:
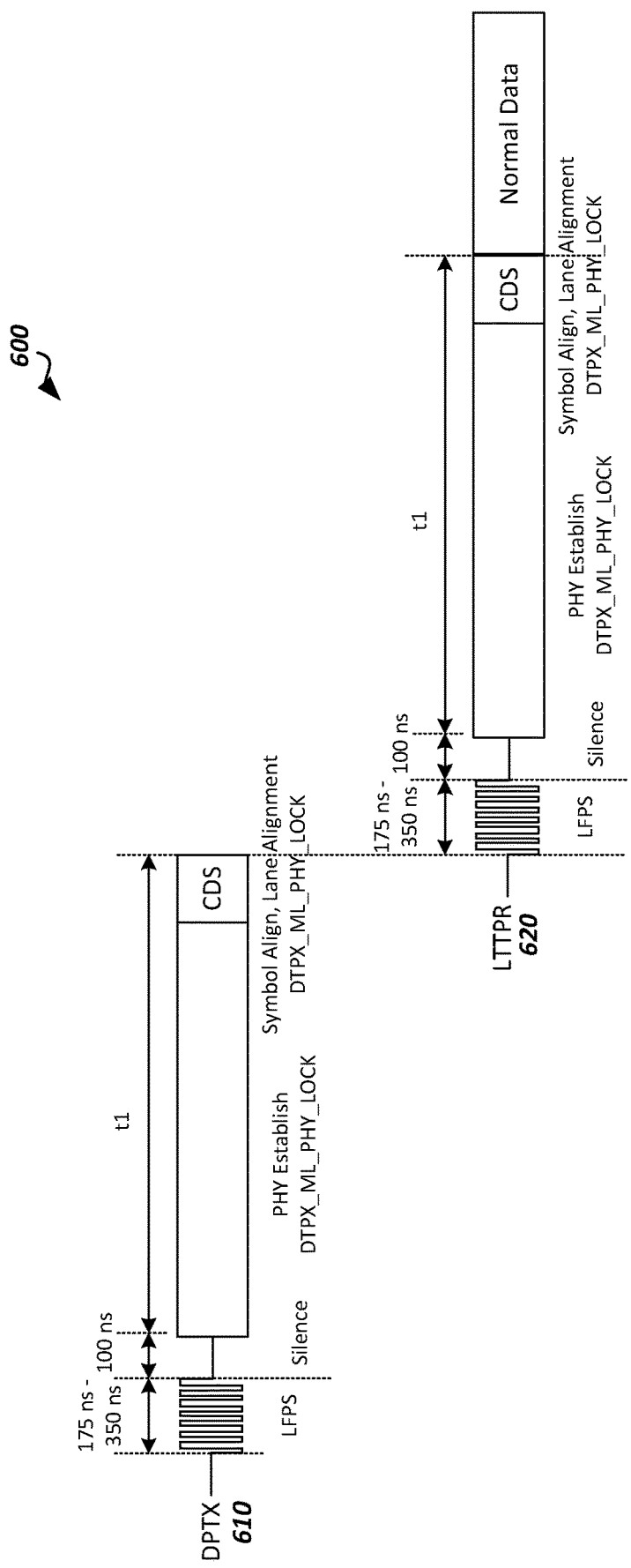
FIG. 6 illustrates another example LFPS-based wake sequence in a DisplayPort-based topology in accordance with certain embodiments.

FIG. 6 illustrates another example LFPS-based wake sequence 600 in a DisplayPort-based topology in accordance with certain embodiments. In particular, in the example shown, the wake signaling sequence 600 occurs sequentially through the topology (as opposed to the repeating implementation shown in FIGS. 5A-5B). For instance, the example wake sequence 600 includes the DPTX 610 (which may be implemented similar to the DPTX 510 of FIGS. 5A-5B) initiating a wake pulse sequence similar to the sequences of segment 410 of FIG. 4 and segment 320 of FIG. 3, which is followed by a period of silence, a PHY establishment sequence, and a CDS sequence as described above. However, instead of quickly initiating the wake pulse sequence as described above with respect to FIGS. 5A-5B (i.e., only with slight delay of ~10-15 us), the LTTPR 620 may wait until the CDS sequence is complete before transmitting the wake pulse sequence to the next hop in the topology (e.g., another LTTPR or a DPRX). This sequential transmission pattern may continue until the DPRX is reached, after which the normal data stream may be initiated (as shown).

The example sequence 600 may simplify branch device implementations, e.g., in the LTTPR devices, by allowing the device to be in a deeper sleep state for a longer time, thus allowing for better power management. For instance, in some cases, the DPTX and DPRX power savings achieved through the sequence 600 may remain unchanged from the example sequence 600 described above; however, the power savings in the LTTPRs may be doubled. However, there may be a latency overhead with a fully sequential wake such as the sequence 600. For example, exit time (from sleep/standby) may be 60 uSec-70 uSec with an additional 60 uSec-70 uSec per LTTPR in the topology.

Figure 7:
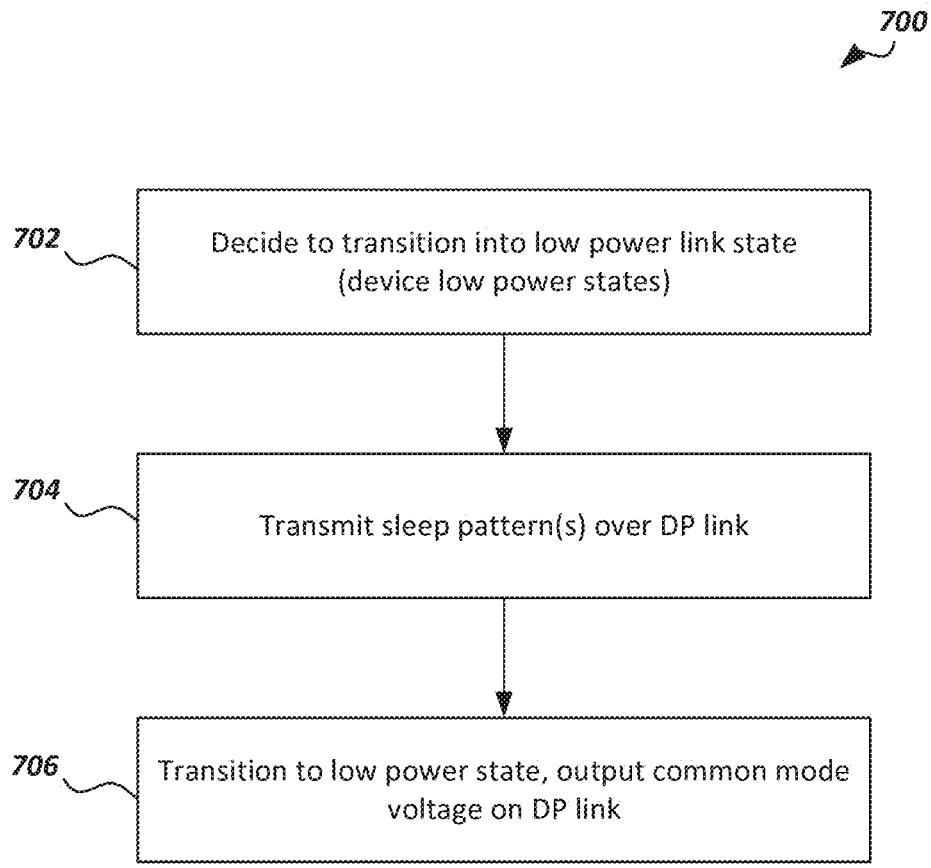
FIG. 7 is a flow diagram of an example process of initiating a transition from an active link state to a low power link state in accordance with certain embodiments.
Figure 8:
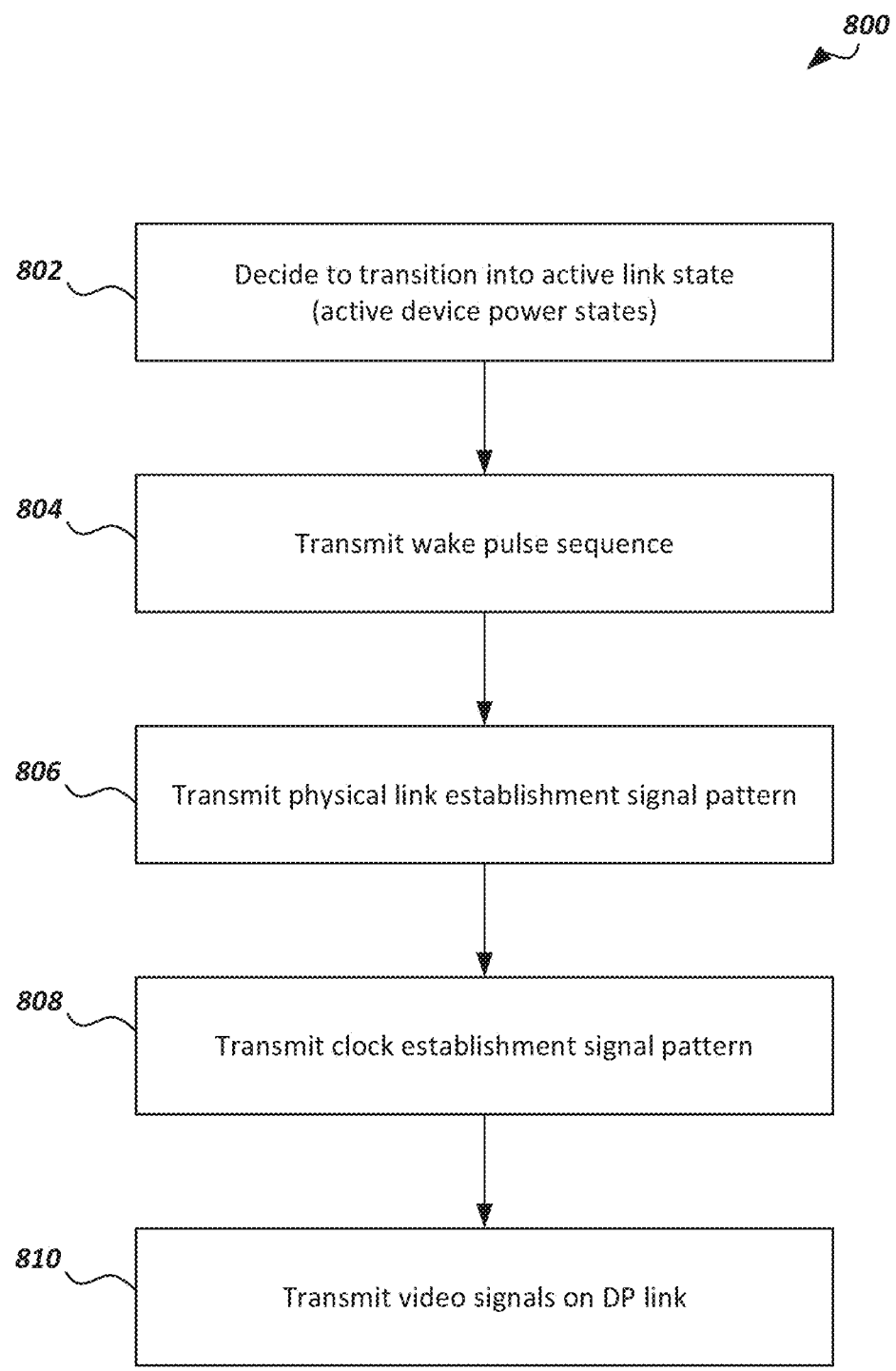
FIG. 8 is a flow diagram of an example process of initiating a transition from a low power link state to an active link state in accordance with certain embodiments.

One or more of the following processes may be used to initiate power state transitions in devices of a DP-based link (e.g., a link between a video source device and display that is implemented based on a DisplayPort (DP) or embedded DisplayPort (eDP) specification (e.g., DP v2.1 or higher, or eDP v1.5 or higher)). The example processes may be implemented in software, firmware, hardware, or a combination thereof. In some embodiments, a computer-readable medium (e.g., volatile memory non-volatile memory, or a combination thereof) may be encoded with instructions that implement one or more of the operations in the example processes below. For example, in some embodiments, operations in the example processes shown in FIGS. 7-8, may be performed by one or more components of a video source device (e.g., GPU 144 of FIG. 1). The example processes may include additional or different operations, and the operations may be performed in the order shown or in another order. In some cases, one or more of the operations shown in FIGS. 7-8 are implemented as processes that include multiple operations, sub-processes, or other types of routines. In some cases, operations can be combined, performed in another order, performed in parallel, iterated, or otherwise repeated or performed another manner.

FIG. 7 is a flow diagram of an example process 700 of initiating a transition from an active link state to a low power link state in accordance with certain embodiments. The low power link state may refer to the scenario where devices of the DP link are transitioned into a low power state and transmit/output a common mode voltage rather than active signals (e.g., video signals) on the DP link.

At 702, the video display source decides to transition to the low power link state. The determination may be made for any suitable reason. At 704, one or more sleep signal patterns are transmitted over the DP link. The sleep pattern may be formatted as described above with respect to FIG. 2. As described above with respect to FIG. 2, the number of sleep patterns transmitted by the video source device or intermediate devices may be dependent on the number of devices of the DP link. In some instances, scrambled zeroes may be transmitted between each sleep pattern transmitted. At 706, after the required number of sleep patterns are transmitted on the DP link, the video source device transitions into the low power state and outputs a common mode voltage on the link (i.e., does not transmit video signals or other data on the link).

FIG. 8 is a flow diagram of an example process 800 of initiating a transition from a low power link state to an active link state in accordance with certain embodiments. The active link state may refer to the scenario where devices of the DP link are transitioned into or are in an active power state and transmit/output active data signals (e.g., video signals) on the DP link.

At 802, the video display source decides to transition to the active link state. The determination may be made for any suitable reason. At 804, a wake pulse sequence is transmitted on the DP link. The wake pulse sequence may be formatted as described above with respect to segment 320 of FIG. 3. In some embodiments, a period of "silence" (i.e., the common mode voltage may be transmitted on the link) may follow the wake pulse sequence as described above with respect to FIGS. 3-4. At 806, a physical link establishment signal pattern is transmitted on the link. The physical link establishment pattern may be formatted as described above with respect to FIGS. 3-4. At 808, a clock establishment signal pattern is transmitted on the link. The clock establishment signal pattern may be formatted as described above with respect to FIGS. 3-4. Finally, at 810, video signals are transmitted on the DP link.

Figure 9:
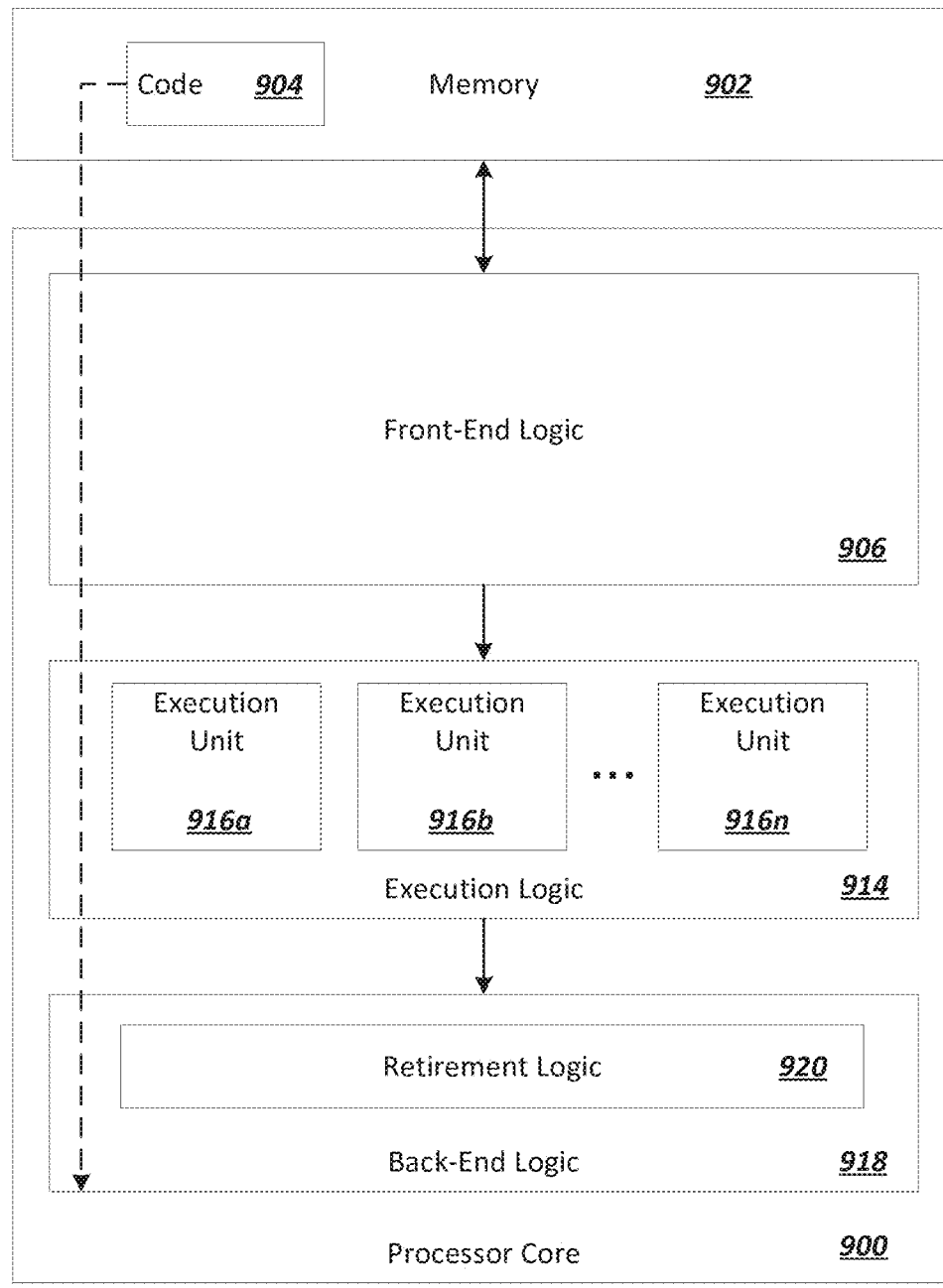
FIG. 9 is an example illustration of a processor according to an embodiment.
Figure 10:
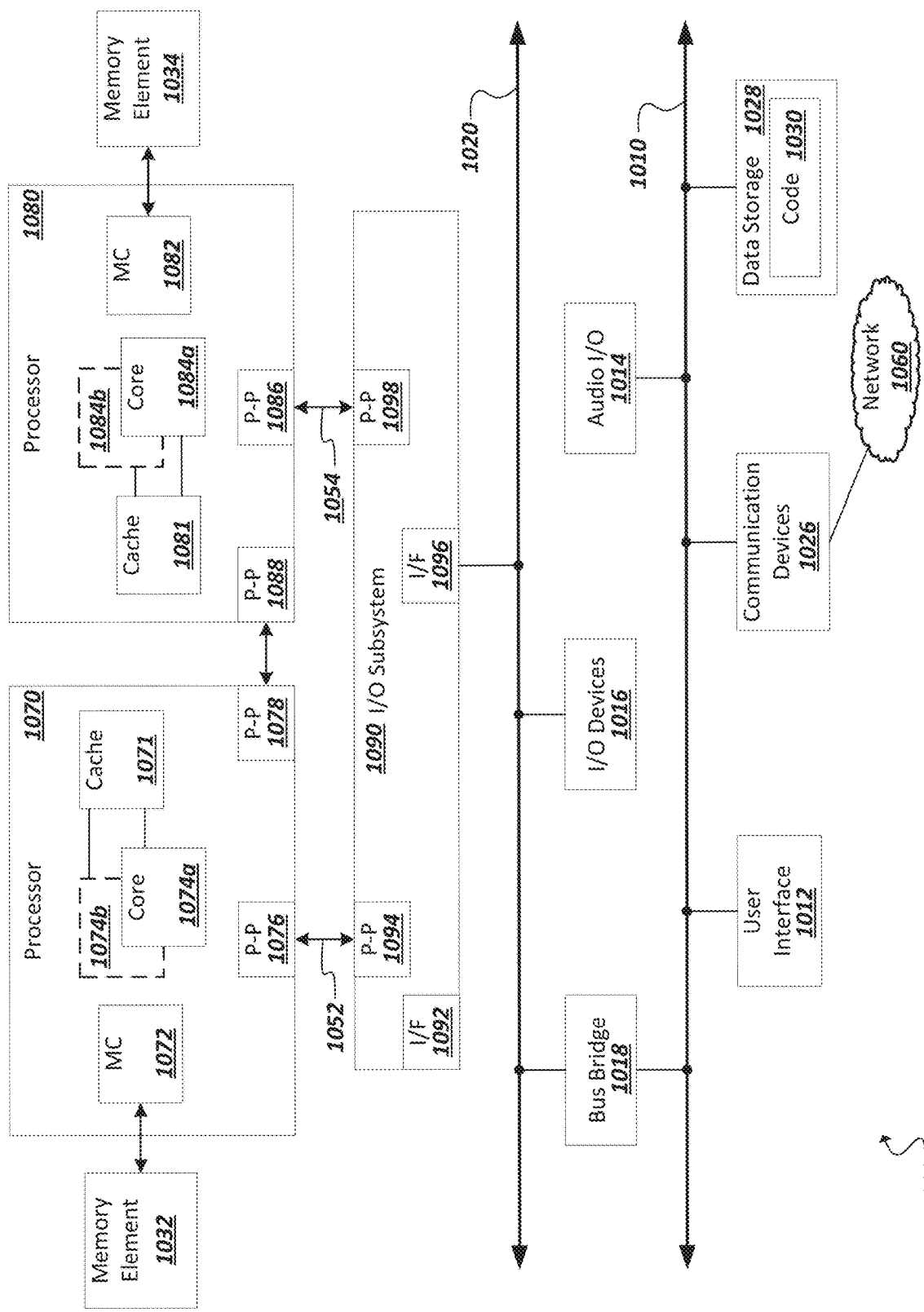
FIG. 10 illustrates a computing system that is arranged in a point-to-point (PtP) configuration according to an embodiment.

FIGS. 9-10 are block diagrams of example computer architectures that may be used in accordance with embodiments disclosed herein. For example, in some embodiments, a computer system (e.g., a computer system 100) may contain one or more aspects shown in FIGS. 9-10 (e.g., video source device 104 may be implemented with one or more components shown in FIGS. 9 and 10) and may implement one or more aspects of the present disclosure. Other computer architecture designs known in the art for processors and computing systems may also be used. Generally, suitable computer architectures for embodiments disclosed herein can include, but are not limited to, configurations illustrated in FIGS. 9-10.

FIG. 9 is an example illustration of a processor according to an embodiment. Processor 900 is an example of a type of hardware device that can be used in connection with the implementations above. Processor 900 may be any type of processor, such as a microprocessor, an embedded processor, a digital signal processor (DSP), a network processor, a multi-core processor, a single core processor, or other device to execute code. Although only one processor 900 is illustrated in FIG. 9, a processing element may alternatively include more than one of processor 900 illustrated in FIG. 9. Processor 900 may be a single-threaded core or, for at least one embodiment, the processor 900 may be multi-threaded in that it may include more than one hardware thread context (or "logical processor") per core.

FIG. 9 also illustrates a memory 902 coupled to processor 900 in accordance with an embodiment. Memory 902 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 900 can execute any type of instructions associated with algorithms, processes, or operations detailed herein. Generally, processor 900 can transform an element or an article (e.g., data) from one state or thing to another state or thing.

Code 904, which may be one or more instructions to be executed by processor 900, may be stored in memory 902, or may be stored in software, hardware, firmware, or any suitable combination thereof, or in any other internal or external component, device, element, or object where appropriate and based on particular needs. In one example, processor 900 can follow a program sequence of instructions indicated by code 904. Each instruction enters a front-end logic 906 and is processed by one or more decoders 908. The decoder may generate, as its output, a micro operation such as a fixed width micro operation in a predefined format, or may generate other instructions, microinstructions, or control signals that reflect the original code instruction. Front-end logic 906 also includes register renaming logic 910 and scheduling logic 912, which generally allocate resources and queue the operation corresponding to the instruction for execution.

Processor 900 can also include execution logic 914 having a set of execution units 916a, 916b, 916n, etc. Some embodiments may include a number of execution units dedicated to specific functions or sets of functions. Other embodiments may include only one execution unit or one execution unit that can perform a particular function. Execution logic 914 performs the operations specified by code instructions.

After completion of execution of the operations specified by the code instructions, back-end logic 918 can retire the instructions of code 904. In one embodiment, processor 900 allows out of order execution but requires in order retirement of instructions. Retirement logic 920 may take a variety of known forms (e.g., re-order buffers or the like). In this manner, processor 900 is transformed during execution of code 904, at least in terms of the output generated by the decoder, hardware registers and tables utilized by register renaming logic 910, and any registers (not shown) modified by execution logic 914.

Although not shown in FIG. 9, a processing element may include other elements on a chip with processor 900. For example, a processing element may include memory control logic along with processor 900. The processing element may include I/O control logic and/or may include I/O control logic integrated with memory control logic. The processing element may also include one or more caches. In some embodiments, non-volatile memory (such as flash memory or fuses) may also be included on the chip with processor 900.

FIG. 10 illustrates a computing system 1000 that is arranged in a point-to-point (PtP) configuration according to an embodiment. In particular, FIG. 10 shows a system where processors, memory, and input/output devices are interconnected by a number of point-to-point interfaces. Generally, one or more of the computing systems described herein may be configured in the same or similar manner as computing system 1000.

Processors 1070 and 1080 may also each include integrated memory controller logic (MC) 1072 and 1082 to communicate with memory elements 1032 and 1034. In alternative embodiments, memory controller logic 1072 and 1082 may be discrete logic separate from processors 1070 and 1080. Memory elements 1032 and/or 1034 may store various data to be used by processors 1070 and 1080 in achieving operations and functionality outlined herein.

Processors 1070 and 1080 may be any type of processor, such as those discussed in connection with other figures. Processors 1070 and 1080 may exchange data via a point-to-point (PtP) interface 1050 using point-to-point interface circuits 1078 and 1088, respectively. Processors 1070 and 1080 may each exchange data with a chipset 1090 via individual point-to-point interfaces 1052 and 1054 using point-to-point interface circuits 1076, 1086, 1094, and 1098. Chipset 1090 may also exchange data with a co-processor 1038, such as a high-performance graphics circuit, machine learning accelerator, or other co-processor 1038, via an interface 1039, which could be a PtP interface circuit. In alternative embodiments, any or all of the PtP links illustrated in FIG. 10 could be implemented as a multi-drop bus rather than a PtP link.

Chipset 1090 may be in communication with a bus 1020 via an interface circuit 1096. Bus 1020 may have one or more devices that communicate over it, such as a bus bridge 1018 and I/O devices 1016. Via a bus 1010, bus bridge 1018 may be in communication with other devices such as a user interface 1012 (such as a keyboard, mouse, touchscreen, or other input devices), communication devices 1026 (such as modems, network interface devices, or other types of communication devices that may communicate through a computer network 1060), audio I/O devices 1016, and/or a data storage device 1028. Data storage device 1028 may store code 1030, which may be executed by processors 1070 and/or 1080. In alternative embodiments, any portions of the bus architectures could be implemented with one or more PtP links.

The computer system depicted in FIG. 10 is a schematic illustration of an embodiment of a computing system that may be utilized to implement various embodiments discussed herein. It will be appreciated that various components of the system depicted in FIG. 10 may be combined in a system-on-a-chip (SoC) architecture or in any other suitable configuration capable of achieving the functionality and features of examples and implementations provided herein.

While some of the systems and solutions described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any embodiments or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. It will be understood that certain examples may be combined with certain other examples, in certain embodiments.

Example 1 includes an apparatus comprising: a port comprising circuitry to couple the apparatus to one or more devices over a DisplayPort (DP)-based link; a processor to generate signals for communication over the DP-based link;

and memory comprising instructions to cause the processor to: initiate a transition to a low power state in devices of the DP-based link by transmitting a sleep pattern signal over the DP-based link; and initiate a transition to an active power state in devices of the DP-based link by transmitting a wake pulse sequence and physical link establishment signal pattern over the DP-based link.

Example 2 includes the subject matter of Example 1 and/or other Example(s), and optionally, wherein the instructions are to transmit the sleep pattern over the DP-based link a number of times equal to the number of devices on the DP-based link other than the apparatus.

Example 3 includes the subject matter of Example 1 or 2 and/or other Example(s), and optionally, wherein each sleep pattern is 80 bits in 8b/10b encoding.

Example 4 includes the subject matter of Example 1 or 2 and/or other Example(s), and optionally, wherein each sleep pattern is 129 bits in 128b/132b encoding.

Example 5 includes the subject matter of Example 2 and/or other Example(s), and optionally, wherein the instructions are to transmit scrambled zeroes between each of the transmitted sleep patterns.

Example 6 includes the subject matter of Example 5 and/or other Example(s), and optionally, wherein the scrambled zeroes are at least 2560 bits in in 8b/10b encoding.

Example 7 includes the subject matter of Example 5 and/or other Example(s), and optionally, wherein the scrambled zeroes are at least 4096 bits in 128b/132b encoding.

Example 8 includes the subject matter of any one of Examples 1-7 and/or other Example(s), and optionally, wherein the instructions are to transmit a wake pulse sequence that includes a number of fixed length pulses.

Example 9 includes the subject matter of Example 8 and/or other Example(s), and optionally, wherein the instructions are to transmit at least seven pulses having a pulse length between 25 ns-50 ns.

Example 10 includes the subject matter of Example 8 and/or other Example(s), and optionally, wherein the instructions are to transmit the wake pulse sequence over a period of 175 ns-400 ns.

Example 11 includes the subject matter of any one of Examples 1-10 and/or other Example(s), and optionally, wherein the instructions are to output a common mode voltage between the wake pulse sequence and the physical link establishment signal pattern.

Example 12 includes the subject matter of Example 11 and/or other Example(s), and optionally, wherein the instructions are to output the common mode voltage over a period of 80 ns-120 ns.

Example 13 includes the subject matter of any one of Examples 1-12 and/or other Example(s), and optionally, wherein the instructions are to initiate the transition to the active power state by further transmitting signals to establish a clock signal in the devices of the DP-based link.

Example 14 includes the subject matter of any one of Examples 1-13 and/or other Example(s), and optionally, wherein the instructions are to cause the processor to transmit a common mode voltage over the DP-based link in the low power state, and transmit video signals over the DP-based link in the active power state.

Example 15 includes one or more computer-readable media comprising instructions that, when executed by a machine, cause the machine to: cause a video source device coupled to a display over a DisplayPort (DP)-based link to initiate a transition to a low power state in devices of the DP-based link by transmitting a sleep pattern signal over the DP-based link; and cause the video source device to initiate a transition to an active power state in the devices of the DP-based link by transmitting a wake pulse sequence and physical link establishment signal pattern over the DP-based link.

Example 16 includes the subject matter of Example 15 and/or other Example(s), and optionally, wherein the instructions are to transmit the sleep pattern over the DP-based link a number of times equal to the number of devices on the DP-based link other than the apparatus.

Example 17 includes the subject matter of Example 15 or 16 and/or other Example(s), and optionally, wherein each sleep pattern is 80 bits in 8b/10b encoding.

Example 18 includes the subject matter of Example 15 or 16 and/or other Example(s), and optionally, wherein each sleep pattern is 129 bits in 128b/132b encoding.

Example 19 includes the subject matter of Example 16 and/or other Example(s), and optionally, wherein the instructions are to transmit scrambled zeroes between each of the transmitted sleep patterns.

Example 20 includes the subject matter of Example 19 and/or other Example(s), and optionally, wherein the scrambled zeroes are at least 2560 bits in in 8b/10b encoding.

Example 21 includes the subject matter of Example 19 and/or other Example(s), and optionally, wherein the scrambled zeroes are at least 4096 bits in 128b/132b encoding.

Example 22 includes the subject matter of any one of Examples 15-21 and/or other Example(s), and optionally, wherein the instructions are to transmit a wake pulse sequence that includes a number of fixed length pulses.

Example 23 includes the subject matter of Example 22 and/or other Example(s), and optionally, wherein the instructions are to transmit at least seven pulses having a pulse length between 25 ns-50 ns.

Example 24 includes the subject matter of Example 22 and/or other Example(s), and optionally, wherein the instructions are to transmit the wake pulse sequence over a period of 175 ns-400 ns.

Example 25 includes the subject matter of any one of Examples 15-24 and/or other Example(s), and optionally, wherein the instructions are to output a common mode voltage between the wake pulse sequence and the physical link establishment signal pattern.

Example 26 includes the subject matter of Example 25 and/or other Example(s), and optionally, wherein the instructions are to output the common mode voltage over a period of 80 ns-120 ns.

Example 27 includes the subject matter of any one of Examples 15-26 and/or other Example(s), and optionally, wherein the instructions are to initiate the transition to the active power state by further transmitting signals to establish a clock signal in the devices of the DP-based link.

Example 28 includes the subject matter of any one of Examples 15-27 and/or other Example(s), and optionally, wherein the instructions are to cause the processor to transmit a common mode voltage over the DP-based link in the low power state, and transmit video signals over the DP-based link in the active power state.

Example 29 includes a system comprising: a display; and a video source device coupled to the display over a DisplayPort (DP)-based link, the video source device comprising circuitry to: initiate a transition to a low power state in devices of the DP-based link by transmitting a sleep pattern signal over the DP-based link; and initiate a transition to an active power state in devices of the DP-based link by transmitting a wake pulse sequence and physical link establishment signal pattern over the DP-based link.

Example 30 includes the subject matter of Example 29 and/or other Example(s), and optionally, wherein the circuitry is to initiate the transition to the active power state by further transmitting signals to establish a clock signal in the devices of the DP-based link.

Example 31 includes the subject matter of Example 29 or 30 and/or other Example(s), and optionally, wherein the system comprises one or more intermediate devices between the display and the video source device in the DP-based link.

Example 32 includes the subject matter of Example 31 and/or other Example(s), and optionally, wherein the circuitry is to transmit the sleep pattern signal a number of times equal to one more than the number of intermediate devices.

Example 33 includes the subject matter of Example 31 and/or other Example(s), and optionally, wherein each intermediate device is to transmit the wake pulse sequence to a downstream device of the DP-based link in response to detecting the wake pulse sequence transmitted by an upstream device of the DP-based link.

Example 34 includes the subject matter of Example 31 and/or other Example(s), and optionally, wherein each intermediate device is to transmit the wake pulse sequence to a downstream device of the DP-based link based on detecting the wake pulse sequence and physical link establishment signal pattern transmitted by an upstream device of the DP-based link.

Example 35 includes the subject matter of Example 29 and/or other Example(s), and optionally, wherein the circuitry is to transmit the sleep pattern over the DP-based link a number of times equal to the number of devices on the DP-based link other than the apparatus.

Example 36 includes the subject matter of Example 29 or 35 and/or other Example(s), and optionally, wherein each sleep pattern is 80 bits in 8b/10b encoding.

Example 37 includes the subject matter of Example 29 or 35 and/or other Example(s), and optionally, wherein each sleep pattern is 129 bits in 128b/132b encoding.

Example 38 includes the subject matter of Example 35 and/or other Example(s), and optionally, wherein the instructions are to transmit scrambled zeroes between each of the transmitted sleep patterns.

Example 39 includes the subject matter of Example 38 and/or other Example(s), and optionally, wherein the scrambled zeroes are at least 2560 bits in in 8b/10b encoding.

Example 40 includes the subject matter of Example 38 and/or other Example(s), and optionally, wherein the scrambled zeroes are at least 4096 bits in 128b/132b encoding.

Example 41 includes the subject matter of any one of Examples 29-40 and/or other Example(s), and optionally, wherein the instructions are to transmit a wake pulse sequence that includes a number of fixed length pulses.

Example 42 includes the subject matter of Example 41 and/or other Example(s), and optionally, wherein the instructions are to transmit at least seven pulses having a pulse length between 25 ns-50 ns.

Example 43 includes the subject matter of Example 41 and/or other Example(s), and optionally, wherein the instructions are to transmit the wake pulse sequence over a period of 175 ns-400 ns.

Example 44 includes the subject matter of any one of Examples 29-43 and/or other Example(s), and optionally, wherein the instructions are to output a common mode voltage between the wake pulse sequence and the physical link establishment signal pattern.

Example 45 includes the subject matter of Example 44 and/or other Example(s), and optionally, wherein the instructions are to output the common mode voltage over a period of 80 ns-120 ns.

Example 46 includes the subject matter of any one of Examples 29-45 and/or other Example(s), and optionally, wherein the instructions are to initiate the transition to the active power state by further transmitting signals to establish a clock signal in the devices of the DP-based link.

Example 47 includes the subject matter of any one of Examples 29-46 and/or other Example(s), and optionally, wherein the instructions are to cause the processor to transmit a common mode voltage over the DP-based link in the low power state, and transmit video signals over the DP-based link in the active power state.

Example 48 includes a method of initiating a transition to an active power state in devices of a DisplayPort (DP)-based link, comprising: transmitting a wake pulse sequence from a video source device over a DisplayPort (DP)-based link; transmitting a physical link establishment signal pattern over the DP-based link; transmitting a CDS signal pattern over the DP-based link; and transmitting a video signal over the DP-based link.

Example 49 includes the subject matter of Example 48 and/or other Example(s), and optionally, wherein the instructions are to transmit a wake pulse sequence that includes a number of fixed length pulses.

Example 50 includes the subject matter of Example 49 and/or other Example(s), and optionally, wherein the instructions are to transmit at least seven pulses having a pulse length between 25 ns-50 ns.

Example 51 includes the subject matter of Example 49 and/or other Example(s), and optionally, wherein the instructions are to transmit the wake pulse sequence over a period of 175 ns-400 ns.

Example 52 includes the subject matter of Example 48 and/or other Example(s), and optionally, wherein the instructions are to output a common mode voltage between the wake pulse sequence and the physical link establishment signal pattern.

Example 53 includes the subject matter of Example 52 and/or other Example(s), and optionally, wherein the instructions are to output the common mode voltage over a period of 80 ns-120 ns.

Example 54 includes the subject matter of Example 48 and/or other Example(s), and optionally, wherein the instructions are to initiate the transition to the active power state by further transmitting signals to establish a clock signal in the devices of the DP-based link.

Example 55 includes the subject matter of Example 48 and/or other Example(s), and optionally, further comprising transmitting a sleep pattern over the DP-based link.

Example 56 includes the subject matter of Example 55 and/or other Example(s), and optionally, wherein the sleep pattern is transmitted a number of times equal to the number of devices on the DP-based link other than the apparatus.

Example 57 includes the subject matter of Example 55 or 56 and/or other Example(s), and optionally, wherein each sleep pattern is 80 bits in 8b/10b encoding.

Example 58 includes the subject matter of Example 55 or 56 and/or other Example(s), and optionally, wherein each sleep pattern is 129 bits in 128b/132b encoding.

Example 59 includes the subject matter of Example 56 and/or other Example(s), and optionally, wherein the instructions are to transmit scrambled zeroes between each of the transmitted sleep patterns.

Example 60 includes the subject matter of Example 59 and/or other Example(s), and optionally, wherein the scrambled zeroes are at least 2560 bits in in 8b/10b encoding.

Example 61 includes the subject matter of Example 59 and/or other Example(s), and optionally, wherein the scrambled zeroes are at least 4096 bits in 128b/132b encoding.

Example 62 includes an apparatus for implementing any method as disclosed herein.

Example 63 includes one or more computer-readable media comprising instructions that, when executed by a machine, cause the machine to implement any method as disclosed herein.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. An apparatus comprising:
  a port comprising circuitry to couple the apparatus to a receiver device via one or more intermediate devices over a DisplayPort (DP)-based link;
  a processor to generate signals for communication over the DP-based link; and
  memory comprising instructions to cause the processor to:
    initiate a transition to a low power state in the receiver device and the intermediate devices of the DP-based link by transmitting a number of sleep pattern signals over the DP-based link equal to a number of the intermediate devices plus one; and
    initiate a transition to an active power state in devices of the DP-based link by transmitting a wake pulse sequence and physical link establishment signal pattern over the DP-based link.

2. The apparatus of claim 1, wherein each sleep pattern is 80 bits in 8b/10b encoding.

3. The apparatus of claim 1, wherein each sleep pattern is 129 bits in 128b/132b encoding.

4. The apparatus of claim 1, wherein the instructions are to transmit scrambled zeroes between each of the transmitted sleep patterns.

5. The apparatus of claim 4, wherein the scrambled zeroes are at least 2560 bits in in 8b/10b encoding.

6. The apparatus of claim 4, wherein the scrambled zeroes are at least 4096 bits in 128b/132b encoding.

7. The apparatus of claim 1, wherein the instructions are to transmit a wake pulse sequence that includes a number of fixed length pulses.

8. The apparatus of claim 7, wherein the instructions are to transmit at least seven pulses having a pulse length between 25 ns-50 ns.

9. The apparatus of claim 7, wherein the instructions are to transmit the wake pulse sequence over a period of 175 ns-400 ns.

10. The apparatus of claim 1, wherein the instructions are to output a common mode voltage between the wake pulse sequence and the physical link establishment signal pattern.

11. The apparatus of claim 10, wherein the instructions are to output the common mode voltage over a period of 80 ns-120 ns.

12. The apparatus of claim 1, wherein the instructions are to initiate the transition to the active power state by further transmitting signals to establish a clock signal in the devices of the DP-based link.

13. The apparatus of claim 1, wherein the intermediate devices comprise link-training tunable PHY repeaters (LTT-PRs).

14. The apparatus of claim 1, wherein the instructions cause the processor to transmit the sleep pattern signals and the wake pulse sequence over the main link of the DP-based link.

15. One or more non-transitory computer-readable media comprising instructions that, when executed by a machine, cause the machine to:
  cause a video source device coupled to a display over a DisplayPort (DP)-based link to initiate a transition to a low power state in the devices of the DP-based link by transmitting a number of sleep pattern signals over the DP-based link equal to one plus a number of intermediate devices on the DP-based link between the video source and the display; and
  cause the video source device to initiate a transition to an active power state in the devices of the DP-based link by transmitting a wake pulse sequence and physical link establishment signal pattern over the DP-based link.

16. The computer-readable media of claim 14, wherein the instructions are to transmit scrambled zeroes between each of the transmitted sleep patterns.

17. The computer-readable media of claim 15, wherein the instructions are to transmit a wake pulse sequence that includes a number of fixed length pulses.

18. The computer-readable media of claim 15, wherein the instructions are to output a common mode voltage between the wake pulse sequence and the physical link establishment signal pattern.

19. The computer-readable media of claim 15, wherein the instructions are to initiate the transition to the active power state by further transmitting signals to establish a clock signal in the devices of the DP-based link.

20. The computer-readable media of claim 15, wherein the instructions cause the video source device to transmit the sleep pattern signals and the wake pulse sequence over the main link of the DP-based link.

21. A system comprising:
  a display;
  one or more intermediate devices; and
  a video source device coupled to the display and the intermediate devices over a DisplayPort (DP)-based link, the video source device comprising circuitry to:
    initiate a transition to a low power state in the devices of the DP-based link by transmitting a number of sleep pattern signals over the DP-based link equal to the number of repeater devices plus one; and
    initiate a transition to an active power state in devices of the DP-based link by transmitting a wake pulse sequence and physical link establishment signal pattern over the DP-based link.

22. The system of claim 21, wherein the circuitry is to initiate the transition to the active power state by further transmitting signals to establish a clock signal in the devices of the DP-based link.

23. The system of claim 21, wherein each intermediate device is to transmit the wake pulse sequence to a downstream device of the DP-based link in response to detecting the wake pulse sequence transmitted by an upstream device of the DP-based link.

24. The system of claim 21, wherein each intermediate device is to transmit the wake pulse sequence to a downstream device of the DP-based link based on detecting the wake pulse sequence and physical link establishment signal pattern transmitted by an upstream device of the DP-based link.

25. The system of claim 21, wherein the intermediate devices comprise link-training tunable PHY repeaters (LTT-PRs).

\* \* \* \* \*